(12) United States Patent
Atkinson et al.

(10) Patent No.: US 10,757,871 B2
(45) Date of Patent: Sep. 1, 2020

(54) TREE SUPPORT ASSEMBLY

(71) Applicant: KB VENTURES LLC, Malad City, ID (US)

(72) Inventors: Steven K. Atkinson, Malad City, ID (US); Kenneth Bruce Kidman, Mendon, UT (US)

(73) Assignee: KB VENTURES LLC, Malad City, ID (US)

( * ) Notice: Subject to any disclaimer, the term of this patent is extended or adjusted under 35 U.S.C. 154(b) by 185 days.

(21) Appl. No.: 16/113,207

(22) Filed: Aug. 27, 2018

(65) Prior Publication Data

US 2019/0059246 A1     Feb. 28, 2019

Related U.S. Application Data

(60) Provisional application No. 62/550,813, filed on Aug. 28, 2017.

(51) Int. Cl.
*A01G 17/14*     (2006.01)

(52) U.S. Cl.
CPC .................................. *A01G 17/14* (2013.01)

(58) Field of Classification Search
CPC ........ A01G 17/14; A01G 17/04; A01G 17/08; A01G 17/12; A01G 17/16; A47G 23/02; A47G 23/04
USPC ................. 47/43, 42, 44, 45, 46, 47, 58.1 R
See application file for complete search history.

(56) References Cited

U.S. PATENT DOCUMENTS

| | | | |
|---|---|---|---|
| 1,217,606 A * | 2/1917 | Kane | E21B 19/24 384/24 |
| 2,501,255 A * | 3/1950 | Bell | A01G 17/04 47/43 |
| 2,591,638 A * | 4/1952 | Trafton | A01G 17/14 294/110.1 |
| 2,853,261 A | 9/1958 | Loeb | |
| 2,875,968 A | 3/1959 | Ekola | |
| 3,719,340 A * | 3/1973 | Norton | A47G 33/12 248/523 |
| 4,438,896 A | 3/1984 | Hall | |
| 4,699,347 A | 10/1987 | Kuhnley | |
| 4,834,437 A * | 5/1989 | Howard, Sr. | B25J 1/04 114/221 R |

(Continued)

OTHER PUBLICATIONS

U.S. Appl. No. 12/960,240, filed on Dec. 3, 2010.

*Primary Examiner* — Ebony E Evans
(74) *Attorney, Agent, or Firm* — Maschoff Brennan

(57) ABSTRACT

A tree support assembly may include three or more adjustable legs and a support ring. The support ring may include a first half and a second half that each includes a first end and a second end, a hinge pivotally connecting the respective first ends of the first half and the second half, and a protrusion extending from the second end of the first half. Additionally, the support ring may include an opening disposed within the second end of the second half, in which the protrusion of the first half may be positioned within the opening of the second half in a closed-ring configuration. The support ring may also include a securing feature and an engaging feature that engages with an arm of the securing feature in the closed-ring configuration. In addition, the support ring may include three or more receiving cavities that each receives one of the adjustable legs.

16 Claims, 9 Drawing Sheets

(56) References Cited

U.S. PATENT DOCUMENTS

| | | | | |
|---|---|---|---|---|
| 5,002,252 A * | 3/1991 | Setala | ............... | A47G 33/12 |
| | | | | 248/523 |
| 5,725,193 A * | 3/1998 | Adams | ............... | A01G 9/124 |
| | | | | 248/523 |
| 6,370,817 B1 | 4/2002 | Brooks et al. | | |
| 6,612,071 B1 | 9/2003 | Steadman | | |
| 6,991,203 B2 | 1/2006 | Steadman | | |
| 7,350,671 B2 * | 4/2008 | Mika | ............... | B67D 3/0009 |
| | | | | 222/129 |
| 8,118,340 B2 * | 2/2012 | Jantzen | ............ | A01G 23/099 |
| | | | | 294/191 |
| 2002/0078624 A1 | 6/2002 | Saxon et al. | | |

* cited by examiner

TREE SUPPORT ASSEMBLY

RELATED APPLICATION

This application claims the benefit under 35 U.S.C. § 119(e) of U.S. Provisional Application No. 62/550,813, filed on Aug. 28, 2017.

FIELD

The embodiments discussed herein are related to a tree support assembly.

BACKGROUND

Tree supports are often used to help a tree grow in a particular direction. For example, tree supports may be used to help a tree grow up instead of sagging. Tree supports may be used with a variety of different trees of different sizes.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, a tree support assembly may include three or more adjustable legs and a support ring. The support ring may include a first half and a second half that each includes a first end and a second end. The support ring may also include a hinge pivotally connecting the respective first ends of the first half and the second half. Additionally, the support ring may include a protrusion extending from the second end of the first half and an opening disposed within the second end of the second half, in which the protrusion of the first half may be positioned within the opening of the second half in a closed-ring configuration. The support ring may also include a securing feature including an arm and a base, the base disposed on an exterior surface of the first half or the second half proximate to one of the respective second ends. Additionally, the support ring may include an engaging feature disposed on the exterior surface of the other half opposite the base of the securing feature and proximate to the corresponding second end of the other half, in which the engaging feature may be engaged with the arm of the securing feature in the closed-ring configuration. The support ring may include three or more receiving cavities that each receives one of the adjustable legs, in which the three or more receiving cavities may be disposed within the exterior surface.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
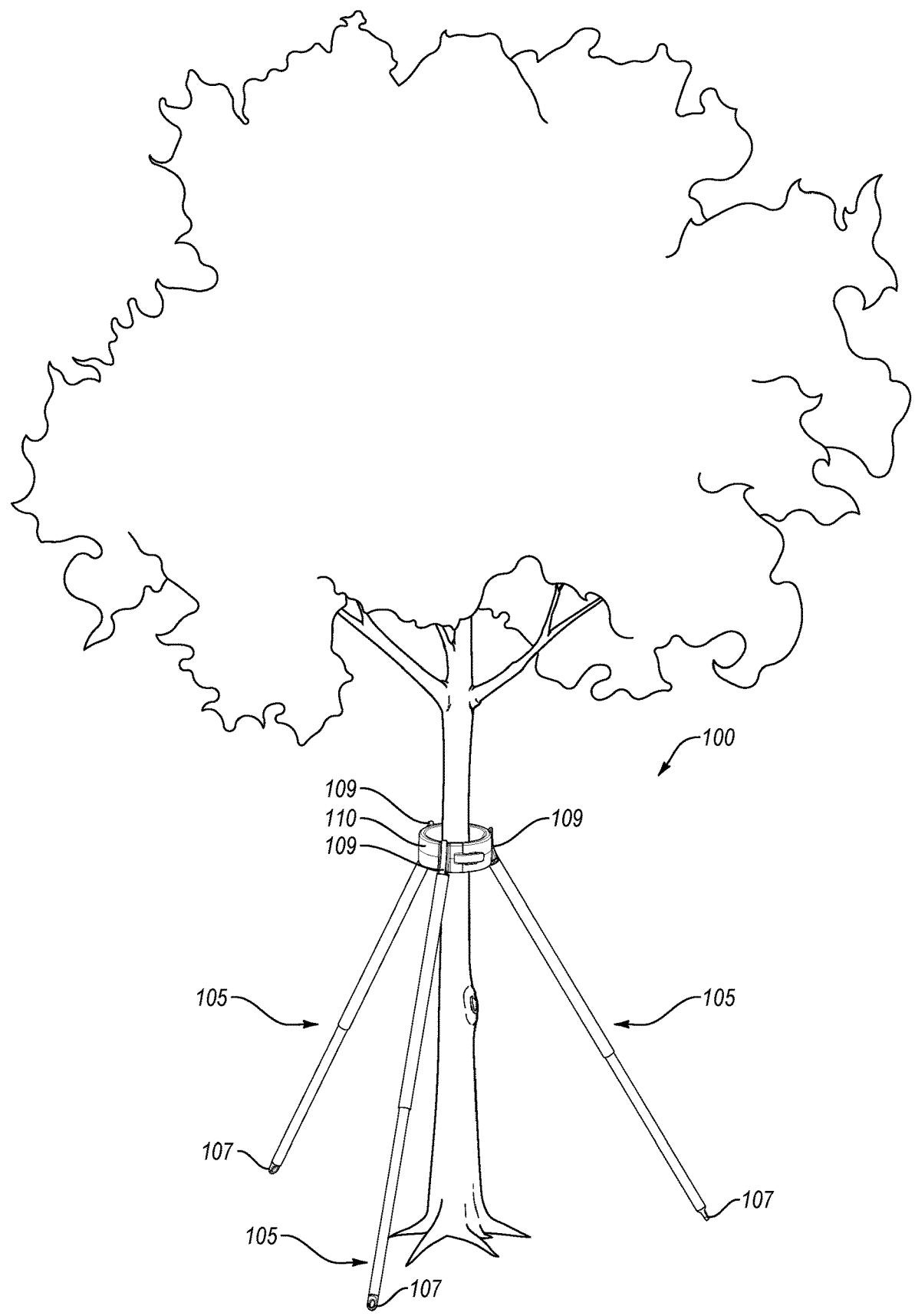
FIG. 1 illustrates an example environment of a tree support assembly.

Some support systems may rely on tree supports such as ropes, to help a tree to grow straight instead of at an angle. Tree supports may also be used to help prevent newly planted trees from too much movement when subjected to exterior forces, such as the wind. Tree supports may be used to restrict the growth of a tree to a particular direction. For example, an individual may use a tree support to correct the growth of a tree that may be leaning to one side.

Guiding a tree's growth shortly after planting it can greatly affect the future health and aesthetic of the tree. Bracing a tree or staking a tree is a common method to help a newly planted tree. These and many common methods often use stakes or rods that are driven into the ground and ropes, ties, cables, ribbon, or other apparatuses that are secured to the tree, strapped to the tree, and/or wrapped over the limbs of the tree so that the tree is constrained in its movement with a pulling force. Oftentimes the device is also left on the tree and forgotten so that it scars the tree. The constant contact, friction, and abrasion of the tree causes scarring and can trap unwanted moisture between the supports and trunks to create unwanted mildew.

The installation may be difficult and sometimes tools, multiple people, tying solutions, and post drivers may be used. Often the installation may include adjustments of several parts that may use tooling in order to adequately support the tree. This kind of installation may be time consuming and expensive.

A common problem associated with many tree supports is that they may directly contact the trunk or branches of the tree. For example, some tree supports may be tied to the tree or clamped to the tree. Because the tree supports touch the tree, they may cause scarring of the tree and may leave lasting marks on the tree. In addition, traditional tree supports may be difficult to install. For example, some tree supports may be installed using a variety of tools or multiple people to correctly install. For example, tree staking is cumbersome, is time intensive, may involve multiple people, is often not reusable, scars trees, and is physically fastened to the tree.

In light of the above, according to one or more embodiments of the present disclosure, a tree support assembly may be configured in a manner that it may be easily adjusted to different heights, provide a support ring without being in continual contact with the trunk of the tree, be quickly installed around a tree without many tools, and may be reused for another tree. One or more embodiments of the present invention may be assembled and installed around a tree quickly, easily, and without tools. According to one or more embodiments of the present disclosure, a tree support assembly may allow free movement of the tree to allow development of the roots under many normal weather patterns and external forces while it may inhibit too much unwanted movement. The tree support assembly may support the tree without being fixed to the tree. One or more embodiments of the present invention may include a smooth and curved and/or convex interior surface on the support ring which may reduce scarring as the tree moves under external forces.

In some embodiments, a tree support assembly may be configured as a self-supporting tripod which may help reduce the movement of newly planted trees due to exterior forces. In these and other embodiments, the tree support assembly may also be configured to alter the direction of growth of a tree. The tree support assembly may be assembled without the use of tools and may be assembled in less time than other tree supporting methods. The support ring around the trunk of the tree may be adjustable in some embodiments and may not be adjustable in some embodiments. In some embodiments, the legs of the tree support assembly may be telescopic legs. Alternatively or additionally, in some embodiments, the legs of the tree support assembly may include a fixed length. The legs may include a foot to secure the tree support assembly to the ground.

In some embodiments, the tree support assembly may be positioned such that the tree support assembly does not touch the tree in calm environments or normal conditions. In these and other embodiments, the tree support assembly may be configured to support the tree in the presence of external forces, such as, for example, winds or gusts, to help protect the tree. Alternatively, in some embodiments, the tree support assembly may be configured to favorably brace against the tree to oppose substantially constant external forces impacting the tree.

Embodiments of the present disclosure will be explained with reference to the accompanying drawings.

FIG. 1 illustrates an example environment of an example tree support assembly 100. The tree support assembly 100 may be arranged according to one or more embodiments of the present disclosure. In the illustrated example of FIG. 1, the tree support assembly 100 may include three or more adjustable legs 105 and a support ring 110 without limitation. The legs 105 may include leg adapters 109 and feet 107 (reference may be made to other figures for all other numbered elements disclosed in conjunction with FIG. 1). Although depicted with three legs, the support assembly 100 may include four legs, ten legs, or any number of legs. Although depicted as circular, the support ring 110 may have another shape such as square, oval, pentagon, rectangular, or any other shape. The support ring 110 may be configured to encompass but not touch the tree. In some embodiments, the legs 105 and/or the support ring 110 may be made from plastic, metal, glass, wood, and/or other materials. In these and other embodiments, the support ring 110 may include a hard and durable plastic.

Each of the three or more legs 105 may be of fixed length or may have variable lengths. For example, in some embodiments, the three or more legs 105 may be telescopic legs. In these and other embodiments, the legs 105 may be adjusted to different lengths to position the support ring 110 to a particular height. For example, in some embodiments, the length of a leg may be adjusted by rotating a first portion of the leg relative to a second portion of the leg. In these and other embodiments, rotating the first portion relative to the second portion in a particular direction may result in allowing elongation and retraction of the leg and rotating the first portion relative to the second portion in a direction opposite the first direction may result in tightening and restraining the elongation and retraction of the leg. Alternatively or additionally, the length of a leg may be adjusted by other types of telescoping or adjusting methods. In these and other embodiments, the tree support assembly 100 may be configured to be used on inclined surfaces. Alternatively or additionally, in some embodiments, the legs 105 may have different lengths. For example, in these and other embodiments, a user may select a different leg to attach to the support ring 110 based on a desired configuration and/or position for the tree support assembly 100.

Each of the three or more legs 105 may be removably attached to the support ring 110. For example, in some embodiments, each of the three or more legs 105 may include a leg adapter 109 on a first end of the legs 105. The leg adapter 109 may be configured to connect the leg 105 to the support ring 110. For example, in some embodiments, the leg adapter 109 may be configured to be inserted into the support ring 110 and to latch onto the support ring 110. In some embodiments, the leg adapter 109 may be configured to interact with a corresponding receiving cavity 155 on the support ring 110 to connect the leg 105 to the support ring 110. For example, in some embodiments, a leg adapter 109 may latch over the top of the support ring 110 when inserted into the receiving cavity 155. In these and other embodiments, a leg 105 may be detached from the support ring 110 by exerting pressure on the leg adapter 109 to disengage the leg adapter 109 from the top of the support ring 110. In some embodiments, the legs 105 may be configured to attach to the support ring 110 without the use of tools.

In some embodiments, each of the three or more legs 105 may include a foot 107 on a second end of the legs 105. In these and other embodiments, the foot 107 may include a hole through which the tree support assembly 100 may be connected or secured to a surface. For example, in some embodiments, a stake may be placed through the hole in the foot 107 and connect the foot 107 to the ground.

The support ring 110 may be configured to open and close around a trunk of a tree or around another object to be supported by the tree support assembly 100. In some embodiments, the support ring 110 may include a first half 110*a* and a second half 110*b*. In these and other embodiments, the support ring 110 may include a hinge 115. The hinge 115 may include a fastener positioned to couple the first end of the first half 110*a* and a first end of the second half 110*b* of the support ring 110. For example, the hinge 115 may be configured to enable the support ring 110 to open and close. In some embodiments, the first half 110*a* and the second half 110*b* may rotate about the hinge 115 from an open configuration to a closed configuration.

In some embodiments, the hinge 115 may include a fastener. In these and other embodiments, the fastener may include a pin, a bolt and nut, a rivet, or another suitable fastener. For example, in some embodiments, the first end of the first half 110*a* of the support ring 110 may include a hole. The first end of the second half 110*b* of the support ring 110 may also include a hole. A pin may be configured to be inserted into the hole on the first half 110*a* and the hole on the second half 110*b*. The pin may connect the first half 110*a* to the second half 110*b* and allow the first half 110*a* and the second half 110*b* to rotate about the pin. In some embodiments, the fastener and/or the holes may be sized and/or configured to increase the friction of opening and closing the support ring 110.

In some embodiments, the support ring 110 may include a closing clip (e.g., securing feature 130) opposite the hinge 115. For example, the closing clip may be positioned on a second end of the first half 110a. In these and other embodiments, an engaging feature 145 with a lip 148 may be positioned on a second end of the second half 110b. In these and other embodiments, the closing clip may be configured to latch the support ring 110 in a closed configuration. In some embodiments, the closing clip may be configured to interact with the engaging feature 145 to secure the support ring 110 in a closed configuration without the use of tools. In some embodiments, the interaction of the closing clip with the engaging feature 145 may hinder the opening of the support ring 110. In these and other embodiments, the support ring 110 may be opened by exerting force on the closing clip away from the engaging feature 145. In some embodiments, an interior surface 152 of the support ring 110 may be shaped with smooth, rounded edges and/or angles.

In some embodiments, the support ring 110 may be sized and/or configured to not fasten to the tree. In some embodiments, placing the support ring 110 around the tree without fastening the support ring 110 to the tree may reduce scarring of the tree. Additionally or alternatively, in some embodiments, the support ring 110 may include a smooth and convex plastic interior surface 152 which may come into contact with the tree in response to the tree moving under external forces. Additionally, in these and other embodiments, the smooth and convex plastic interior of the support ring 110 may reduce moisture and mildew buildup on the support ring 110 and tree. Additionally, in these and other embodiments, the smooth and convex plastic interior surface 152 of the support ring 110 may reduce friction against the tree and prevent scarring and damage to the tree.

One example method of supporting an object is as follows. The support ring 110 may be placed around the object such that there is space between the interior surface 152 of the support ring 110 and the object. In some embodiments, the support ring 110 may be opened by exerting pressure on the closing clip. The support ring 110 may be closed around the object. Three or more legs 105 may be connected to the support ring 110. In some embodiments, a leg adapter 109 on a first end of the leg 105 may be connected to a corresponding receiving cavity 155 on the support ring 110.

In some embodiments, a length of one or more legs 105 may be adjusted to enable the tree support assembly 100 to support the object in a desired position. For example, in some embodiments, the lengths of one or more legs 105 may be adjusted to adjust a height of the support ring 110. In some embodiments, a second end of each of the three or more legs 105 may be connected to a surface. For example, in some embodiments, the legs 105 may be staked to the ground through a hole in a foot 107 in the leg.

Figure 2:
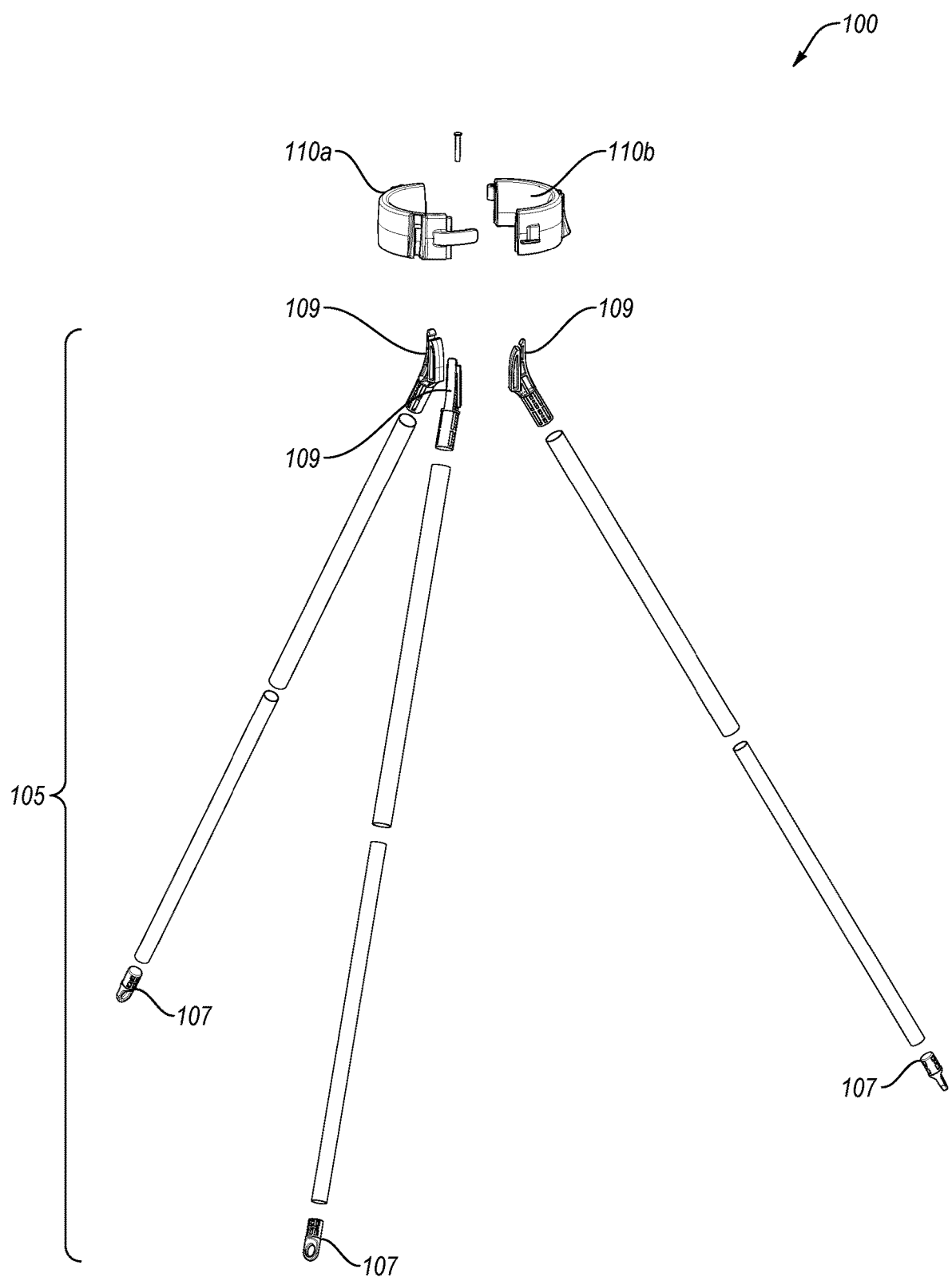
FIG. 2 illustrates an exploded view of an example embodiment of the tree support assembly of FIG. 1.

FIG. 2 illustrates an exploded view of an example embodiment of the tree support assembly 100 of FIG. 1. The tree support assembly 100 may be arranged according to one or more embodiments of the present disclosure. As illustrated, the tree support assembly 100 may include the three or more adjustable legs 105 and the support ring 110 having a first half 110a and a second half 110b, without limitation. The legs 105 may include the leg adapters 109 and the feet 107 (reference may be made to other figures for all other numbered elements disclosed in conjunction with FIG. 2). In some embodiments, the support ring 110 may be substantially circular in shape. Alternatively or additionally, in some embodiments, the support ring 110 may be rectangular, oval, triangular, or any other shape. In some embodiments, the support ring 110 may include a first half 110a and a second half 110b. In some embodiments, the first half 110a and the second half 110b may be approximately the same size. For example, in some embodiments, the first half 110a and the second half 110b may each be approximately half of the support ring 110. For example, in some embodiments, the first half 110a and the second half 110b may each be approximately semicircular in shape. In some embodiments, a first end of the first half 110a may be configured to interface with a first end of the second half 110b. In some embodiments, a second end of the first half 110a may be configured to interface with a second end of the second half 110b. For example, in some embodiments, the first end of the first half 110a and the first end of the second half 110b may be configured in a hinge 115 configuration as discussed above with reference to FIG. 1. In these and other embodiments, a fastener such as, for example, a pin, a rivet, or a bolt and nut, may be configured to allow the first half 110a and the second half 110b of the support ring 110 to rotate open and closed.

In some embodiments, the second end of the first half 110a may include a securing feature 130 (such as a closing clip). The securing feature 130 may be configured as a closing clip configured to interface with an engaging feature 145 including a lip 148 of the second end of the second half 110b. For example, in some embodiments, the closing clip may latch onto the engaging feature 145, which may hinder the unintentional separation of the second end of the first half 110a from the second end of the second half 110b.

In some embodiments, the second end of the first half 110a may be configured to be securely closed against the second end of the second half 110b using a fitted end, such as in a male/female interface. For example, in these and other embodiments, the first half 110a and/or the second half 110b may include a protrusion 120 and the other half may include a correspondingly shaped opening 125. In these and other embodiments, the protrusion 120 and the opening 125 may be sized and/or configured to reduce movement of the protrusion 120 inside of the opening 125. In some embodiments, each of the first half 110a and the second half 110b may include a protrusion 120 and an opening 125. For example, in some embodiments, the first half 110a may include a protrusion 120 in a first location of the first half 110a and an opening 125 in a second location of the first half 110a. In these and other embodiments, the second half 110b may include an opening 125 in a first location of the second half 110b corresponding to the first location of the first half 110a and a protrusion 120 in a second location of the second half 110b corresponding to the second location of the first half 110a. The protrusion 120 on the first half 110a may be sized, shaped, and/or positioned to fit inside the opening 125 in the second half 110b. Similarly, the protrusion 120 on the second half 110b may be sized, shaped, and/or positioned to fit inside the opening 125 in the first half 110a. In some embodiments, the first half 110a and/or the second half 110b may include multiple protrusions 120, openings 125, and other configurations. In some embodiments, the fitted ends may be configured to increase the stability and firmness of the fit when the support ring 110 is in the closed configuration. For example, the fitted ends may help maintain the support ring 110 in the closed configuration.

In some embodiments, the support ring 110 may be curved at a top end and/or a bottom end. For example, in some embodiments, the exterior surface 150 of the support ring 110 may be flat and the interior surface 152 of the support ring 110 may be rounded or convex. In these and other embodiments, the rounded or curved interior surface 152 may help reduce scarring of the tree when the tree comes into contact with the tree support assembly 100, for example as a result of an external force on the tree.

In some embodiments, the support ring 110 may also include a receiving cavity 155 for each leg 105. For example, the support ring 110 may include three receiving cavities 155, one receiving cavity 155 for each of the three legs 105. In some embodiments, the receiving cavities 155 may be approximately equally spaced on the support ring 110. For example, in some embodiments, the receiving cavities 155 may be approximately 120 degrees apart. In these and other embodiments, each receiving cavity 155 may be configured to interface with the leg adapter 109 positioned on a first end of a leg 105. For example, in some embodiments, a leg adapter 109 may include a clip, which may interface with the top of the support ring 110 through the receiving cavity 155.

In some embodiments, the support ring 110, the leg adapter 109, and the foot 107 may include ribbed structures and/or cavities. In these and other embodiments, the ribbed structures and/or the cavities may provide strength and lightness to the support ring 110, the leg adapter 109, and the foot 107. In these and other embodiments, the ribbed structures and/or the cavities may be configured to reduce sagging and instability during a set time of the plastic during manufacturing. In some embodiments, the ribbed structures and/or the cavities may be positioned facing the ground. In these and other embodiments, positioning the ribbed structures and/or the cavities facing the ground may help water and moisture drain from the support ring 110. In some embodiments, the ribbed structures and/or the cavities in the support ring 110 may provide a better fit and strength between the support ring 110, the receiving cavities 155, the leg adapters 109, and the legs 105.

Additionally or alternatively, the foot 107 of the leg may include a hole, as depicted in FIG. 2. In these and other embodiments, a stake or other device may be placed through the hole to fix the foot 107 in position relative to the object supported by the tree support assembly 100. For example, in some embodiments, a stake may be positioned in the hole to secure the foot 107 to the ground. Alternatively or additionally, in some embodiments, the foot 107 may include a hook or a protrusion. In these and other embodiments, the foot 107 may be fixed in position relative to the object using rope, stakes, or other devices. In these and other embodiments, the foot 107 may be fixed to the leg in a manner that allows a hole, hook, or other protrusion to be rotated or spun, either 360 degrees or to a lesser degree, within the leg to a position that allows for easier securing to objects or the ground. For example, when the leg is rotated for extension purposes, the hole on the second end of the leg may need to be rotated 90 degrees in order to secure a stake through the hole and in a downward direction into the ground.

In some embodiments, the foot 107 may be integrated with the leg 105 in a single unit. Alternatively or additionally, in some embodiments, the foot 107 and the leg 105 may be separate units. In these and other embodiments, the foot 107 may be configured to fit inside the leg. For example, the leg may include a recess and the foot 107 may be sized and shaped to fit inside the leg recess. In some embodiments, the foot 107 may be held inside the leg recess using a friction fit. Alternatively or additionally, in some embodiments, the foot 107 may be held inside the leg recess using one or more fasteners between the leg 105 and the foot 107, one or more adhesives between the leg 105 and the foot 107, or any other connector between the leg 105 and the foot 107.

Figure 3:
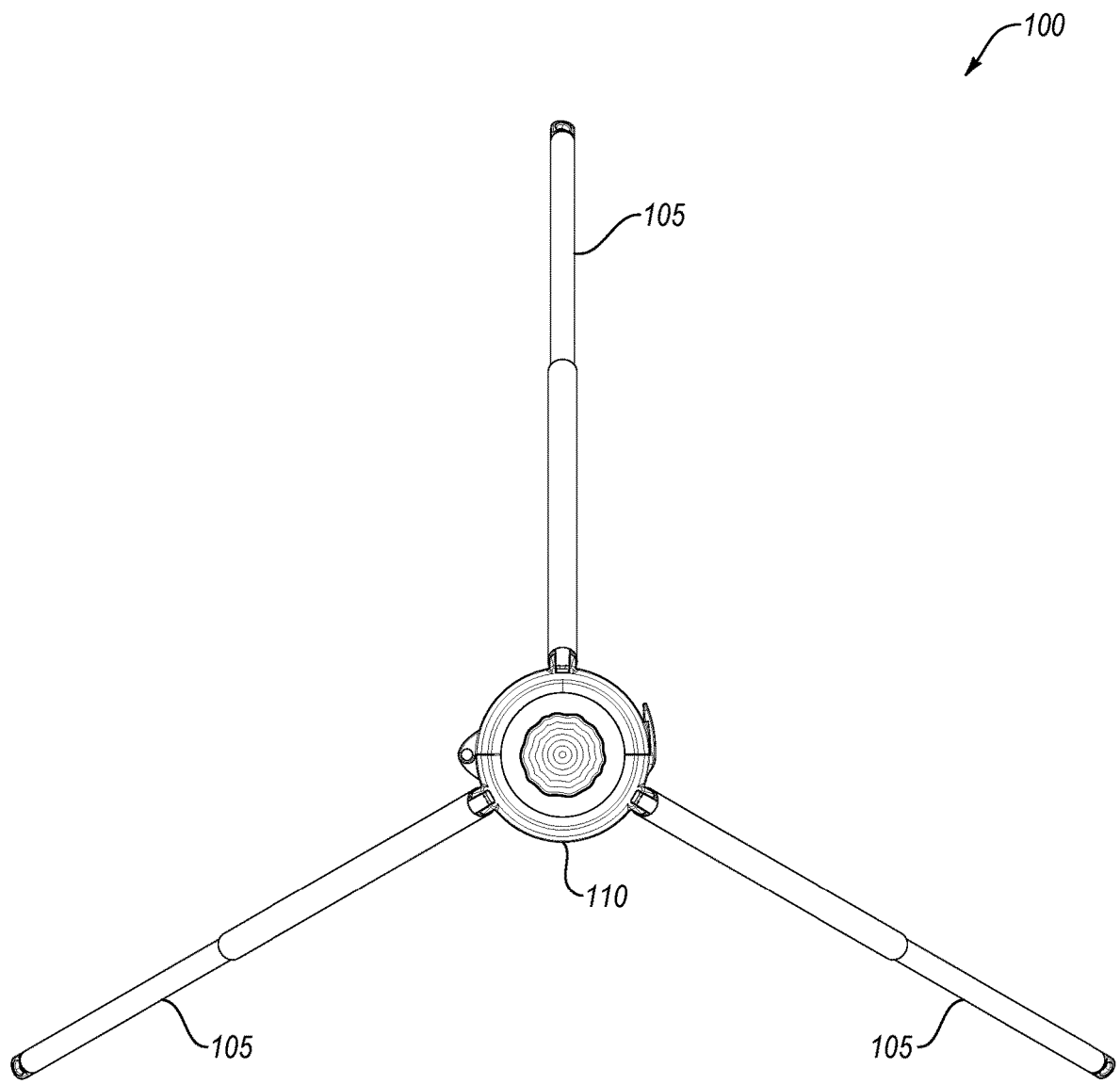
FIG. 3 illustrates a top view of an example embodiment of the tree support assembly of FIG. 1.

FIG. 3 illustrates a top view of an example embodiment of the tree support assembly 100 of FIG. 1, arranged according to one or more embodiments of the present disclosure. The tree support assembly 100 may be placed around an object, such as a tree, and may not be in constant contact with the object. For example, in some embodiments, the tree support assembly 100 may contact the object when the object is subjected to an external force and may not contact the object when the object is at rest. The tree support assembly 100 may be configured to help the support ring 110 provide a counter force against the object in response to the external force.

Figure 4:
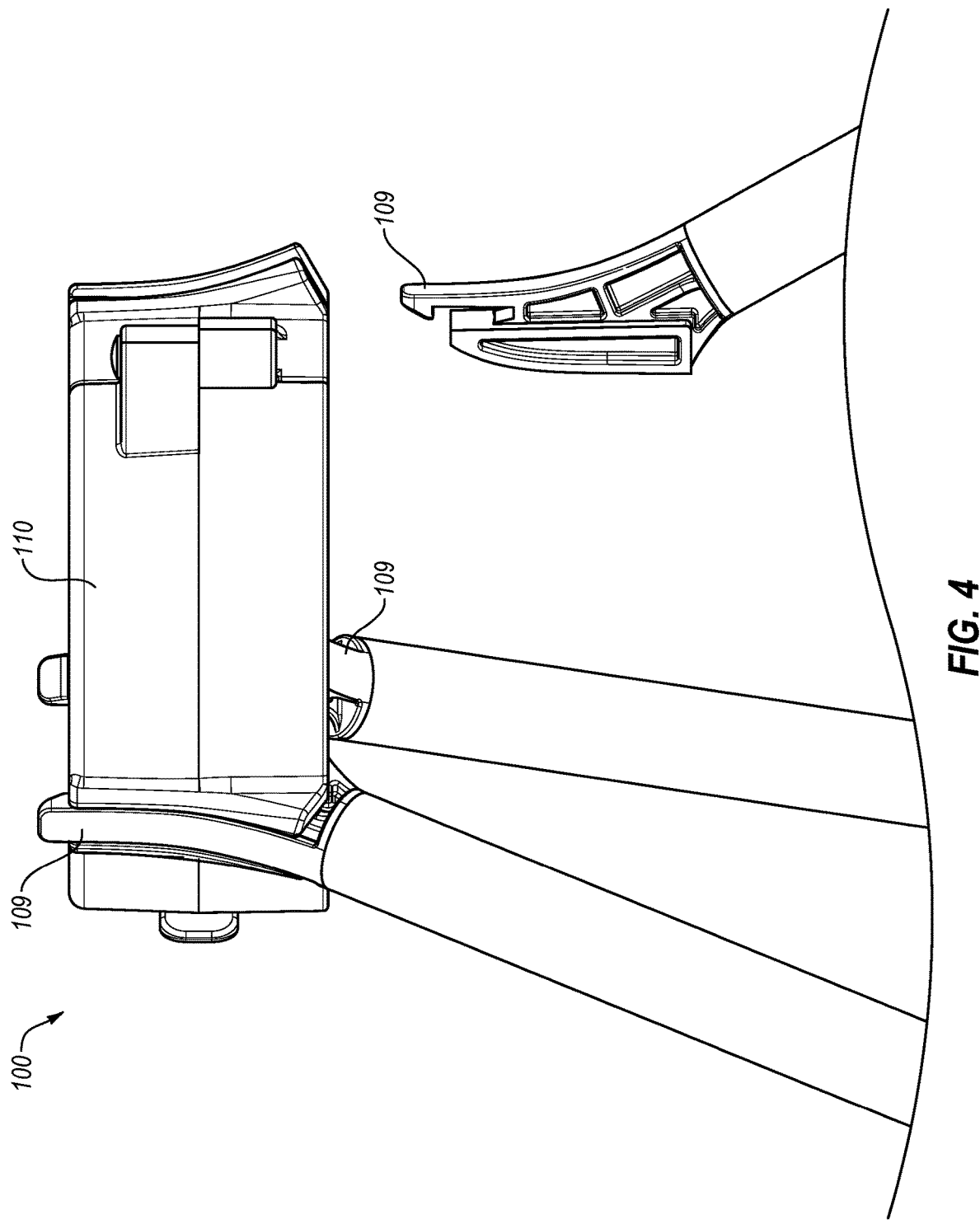
FIG. 4 illustrates a side view of an example embodiment of the tree support assembly of FIG. 1 with a leg in an unconnected state.

FIG. 4 illustrates a side view of an example embodiment of the tree support assembly 100 of FIG. 1 with one of the legs 105 in an unconnected state, all arranged according to one or more embodiments of the present disclosure. As illustrated, the tree support assembly may include leg adapters 109 and the support ring 110 (reference may be made to other figures for all other numbered elements disclosed in conjunction with FIG. 4).

In some embodiments, the legs 105 may each include a leg adapter 109. In some embodiments, the leg adapter 109 may include ribbed portions and/or cavities. In some embodiments, the leg adapter 109 may be integrated with the leg 105 in a single unit. Alternatively or additionally, in some embodiments, the leg adapter 109 and the leg 105 may be separate units. In these and other embodiments, the leg adapter 109 may be configured to fit inside the leg 105. For example, the leg 105 may include a recess and the leg adapter 109 may be sized and shaped to fit inside the leg recess. In some embodiments, the leg adapter 109 may be held inside the leg recess using a friction fit. Alternatively or additionally, in some embodiments, the leg adapter 109 may be held inside the leg recess using one or more fasteners between the leg 105 and the leg adapter 109, one or more adhesives between the leg 105 and the leg adapter 109, or any other connector between the leg 105 and the leg adapter 109. The leg adapter 109 may also be configured to interface with a receiving cavity 155 on the support ring 110. For example, in some embodiments, the leg adapter 109 may include a clip, which may interface (e.g. engage with an engaging portion 180) with the top of the support ring 110. In some embodiments, the interaction of the clip with the top surface (e.g., end wall 170) of the support ring 110 may help prevent unintentional separation of the leg from the support ring 110 (e.g. by engagement with the engaging portion 180). In some embodiments, the clip and/or the top surface (e.g., end wall 170) may be flexible. In these and other embodiments, the leg adapter 109 may be separated from the receiving cavity 155 by exerting force against the clip and/or the top surface (e.g., end wall 170 at the engaging portion 180) and, while exerting force, pulling on the leg 105.

Additionally or alternatively, the shape of the leg adapter 109 on the leg 105 may correspond with the shape of the receiving cavity 155 on the support ring 110. For example, the leg adapter 109 may be sized and/or shaped to fit inside the receiving cavity 155 on the support ring 110. The leg adapter 109 may include a clip configured to catch on the top surface (e.g., end wall 170 via the engaging portion 180) of the support ring 110 when the leg adapter 109 is inserted into the receiving cavity 155 of the support ring 110. In some embodiments, the leg adapter 109 may be sized and/or shaped to fit inside a cavity of the receiving cavity 155 formed by one or more ribs 185 of the support ring 110.

In some embodiments, the leg adapter 109 may include a notch between the clip and a part of the leg adapter 109 shaped to fit inside the receiving cavity 155. In these and other embodiments, the notch may extend in a direction substantially parallel to the clip. In these and other embodiments, the notch may be sized and/or shaped to receive the protrusion of the receiving cavity 155 discussed herein. In some embodiments, the notch may be configured to facilitate unlatching of the clip from the engaging portion 180 of the top surface (e.g., end wall 170) of the support ring 110. In some embodiments, the notch, the clip, and the part of the leg adapter 109 may be configured to reduce motion of the leg adapter 109 inside the receiving cavity 155.

Figure 5:
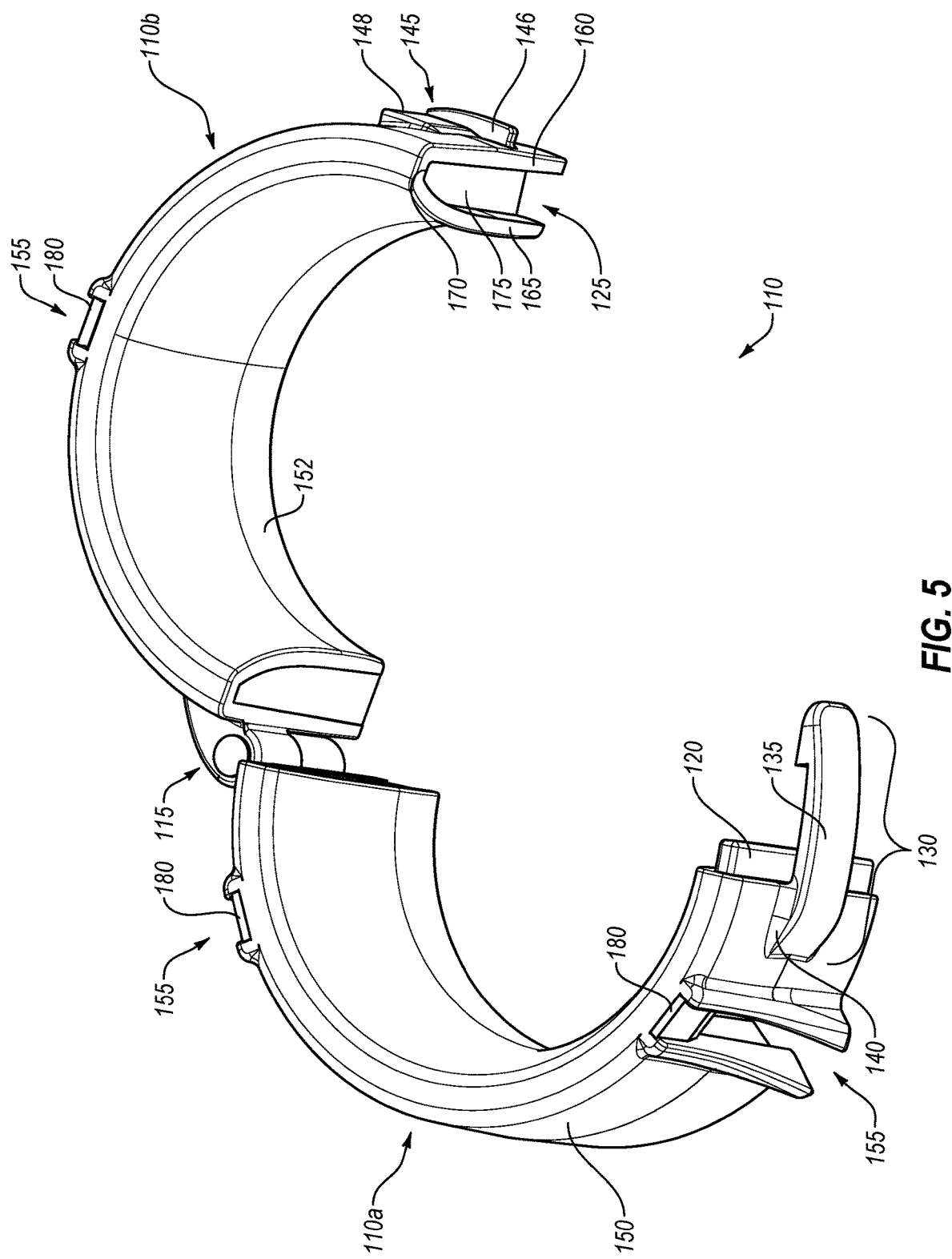
FIG. 5 illustrates a top perspective view of an example embodiment of the support ring of FIG. 1 in an open configuration.

FIG. 5 illustrates a top perspective view of an example embodiment of the support ring 110 of FIG. 1 in an open configuration, arranged according to one or more embodiments of the present disclosure. As illustrated, the support ring 110 with the first half 110a and second half 110b may include a hinge 115, a protrusion 120, an opening 125, a securing feature 130 having an arm 135 and a base 140, an engaging feature 145 having a lip 148 and a support ledge 146, an exterior surface 150, an interior surface 152, receiving cavities 155, an outer wall 160, an inner wall 165, an end wall 170, an inner surface 175 within the opening 125, and an engaging portion 180 disposed within the end wall 170 (reference may be made to other figures for all other numbered elements disclosed in conjunction with FIG. 5). In some embodiments, the receiving cavities 155 may be configured to guide the leg adapters 109 of a leg 105 to facilitate the connection of the legs 105 to the support ring 110.

In these or other embodiments, the support ring 110 may be secured such that up to four degrees of freedom are constrained when the support ring 110 is in the closed configuration (e.g. from the perspective of the first half 110a of the support ring 110). A first degree of freedom defined as upward motion (e.g., ⇧) may be constrained due to one or more of the protrusion 120, an upper portion of the outer wall 160, an upper portion of the inner wall 165, and the end wall 170, when, for example, the first half 110a and the second half 110b are torqued/twisted/sheared relative to each other.

Additionally or alternatively, a second degree of freedom defined as compression motion (e.g., → ←) may be constrained due to one or more of the inner surface 175 abbuttable to the protrusion 120, the end wall 170, the outer wall 160, and the inner wall 165, when, for example, the first half 110a and the second half 110b are pushed towards each other. Additionally or alternatively, a third degree of freedom defined as downward motion (e.g., ⇩) may be constrained due to the support ledge 146 of the engaging feature 145 that inhibits downward movement of the securing feature 130, when, for example, the first half 110a and the second half 110b are torqued/twisted/sheared relative to each other. Additionally or alternatively, a fourth degree of freedom defined as tension motion or outward motion (e.g., ← →) may be constrained due to one or more of the lip 148 of the engaging feature 145 that engages the arm 135 of the securing feature 130, when, for example, the first half 110a and the second half 110b are pulled in opposite directions. In this manner, the support ring 110 may be fully secured when in closed configuration such that little to no movement may occur (e.g., the first half 110a and the second half 110b do not disengage, become open, slip open, etc.) in response to external forces.

Figure 6:
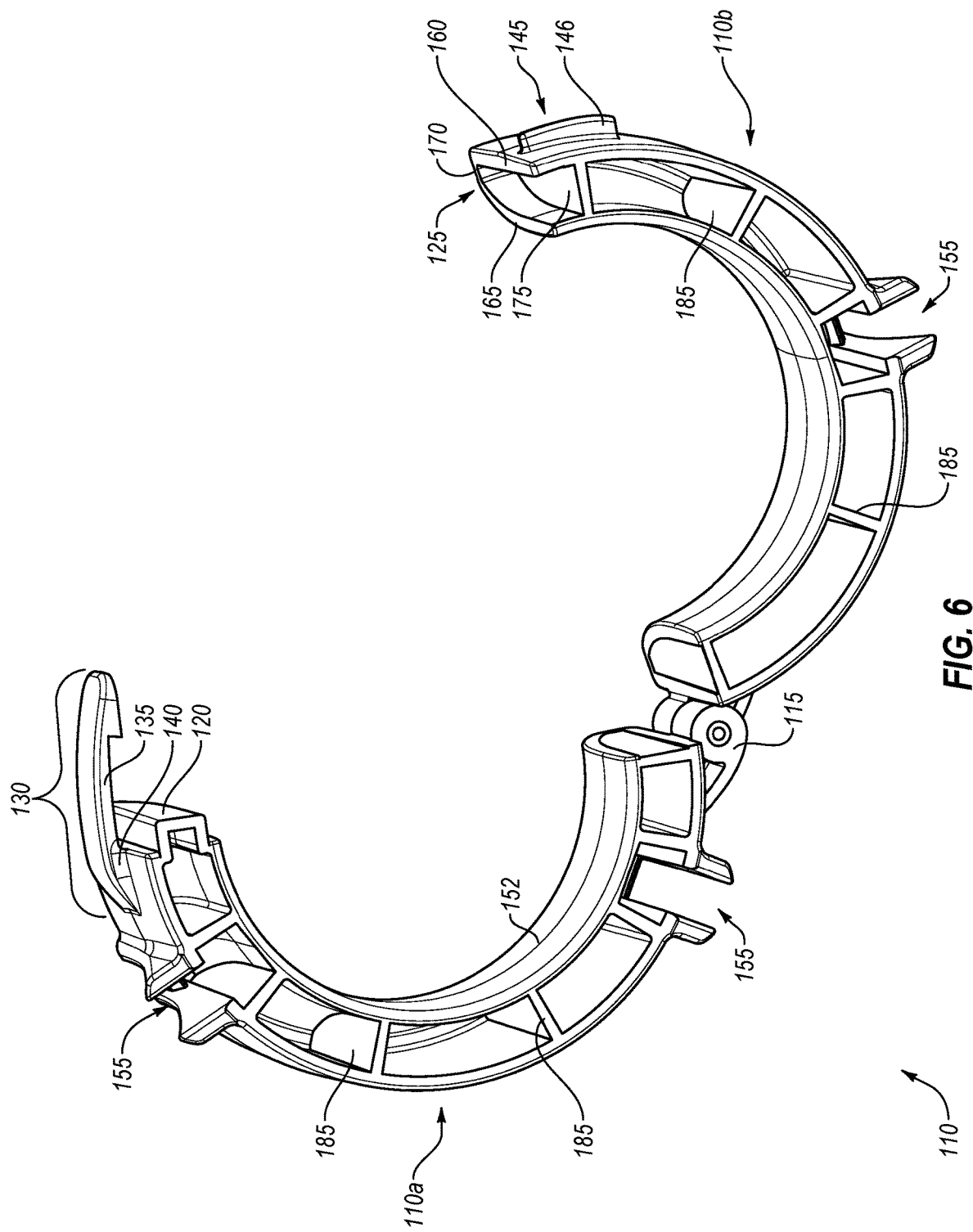
FIG. 6 illustrates a bottom perspective view of an example embodiment of the support ring of FIG. 5 in an open configuration.

FIG. 6 illustrates a bottom perspective view of an example embodiment of the support ring of FIG. 5 in an open configuration, arranged according to one or more embodiments of the present disclosure. As illustrated, the support ring 110 with the first half 110a and second half 110b may include the hinge 115, the protrusion 120, the opening 125, the securing feature 130 having the arm 135 and the base 140, the engaging feature 145 having the support ledge 146, the exterior surface 150, the interior surface 152, the receiving cavities 155, the outer wall 160, the inner wall 165, the end wall 170, the inner surface 175 within the opening 125, and support ribs 185 (reference may be made to other figures for all other numbered elements disclosed in conjunction with FIG. 6).

In some embodiments, the first half 110a of the support ring 110 and the second half 110b of the support ring 110 may include a hollow and/or ribbed structure on a bottom side of the support ring 110. In some embodiments, the hollow support ring 110 may be lighter than a corresponding support ring 110 without a hollow underside. In some embodiments, the ribbed support ring 110 may provide additional strength and a more secure support from the legs 105 while also being lighter than a filled support ring. In some embodiments, the ribbed structure in the support ring 110 may include a series of radially positioned material which may be configured to provide additional strength to the support ring 110. In some embodiments, the ribs 185 of the support ring 110 may include the same material as the body of the support ring 110. In some embodiments, the ribs 185 of the support ring 110 may define cavities of different volumes in the support ring 110.

Additionally or alternatively, the interior of the support ring 110 may include several ribs 185 extending from the interior surface 152 of the support ring 110 to the exterior surface 150 of the support ring 110. The ribs 185 may define multiple cavities on the interior of the support ring 110. In some embodiments, the cavities may include different volumes. In some embodiments, the receiving cavities 155 may include a cavity which may correspond with the size and/or shape of the corresponding leg adapter 109 on the legs 105.

Figure 7:
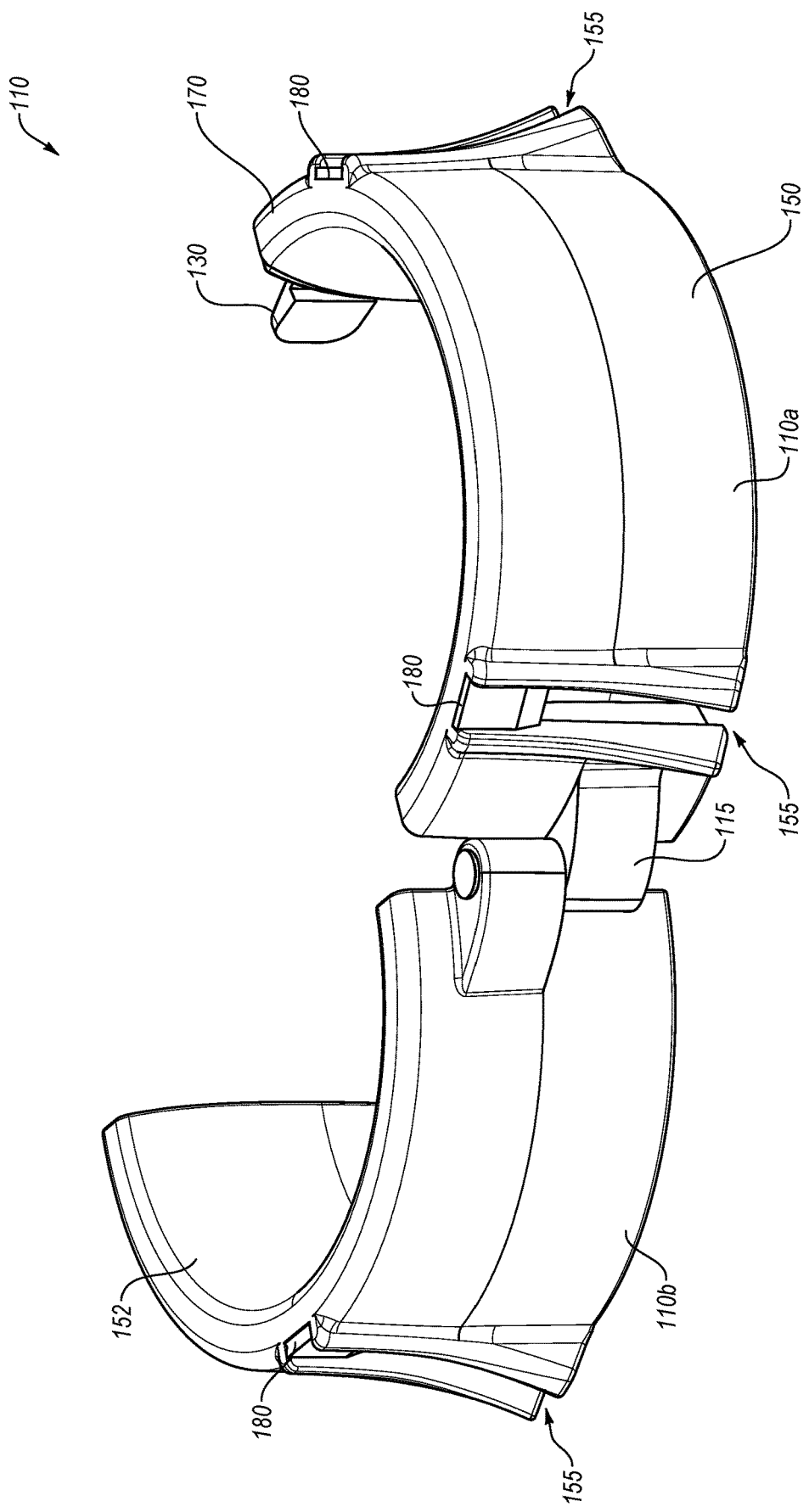
FIG. 7 illustrates another top perspective view of an example embodiment of the support ring of FIGS. 5 and 6.

FIG. 7 illustrates another top perspective view of an example embodiment of the support ring 110 of FIGS. 5 and 6, arranged according to one or more embodiments of the present disclosure. As illustrated, the support ring 110 with the first half 110a and second half 110b may include the hinge 115, the securing feature 130, the exterior surface 150, the interior surface 152, the receiving cavities 155, and the engaging portions 180 (reference may be made to other figures for all other numbered elements disclosed in conjunction with FIG. 7).

The receiving cavities 155 on the support ring 110 may be configured to allow a leg 105 to be inserted into the bottom of the support ring 110 and clip onto the top surface (e.g., end wall 170) of the support ring 110 via the engaging portion 180. In some embodiments, the receiving cavities 155 may include a protrusion which may be sized and/or configured to match the notch in the leg adapter 109 seen in FIG. 4. In some embodiments, the protrusion may extend from the top surface (e.g., end wall 170) of the support ring 110 in a direction substantially parallel to the exterior surface 150 of the support ring 110. In some embodiments, the protrusion may be positioned between two ridges of the receiving cavity 155. In some embodiments, the ridges, the protrusion, the engaging portion 180 of the top surface (e.g., end wall 170) of the support ring 110, and the receiving cavity 155 in the bottom of the support ring 110 may help to secure a leg 105 and the leg adapter 109 to the support ring 110.

Figure 8:
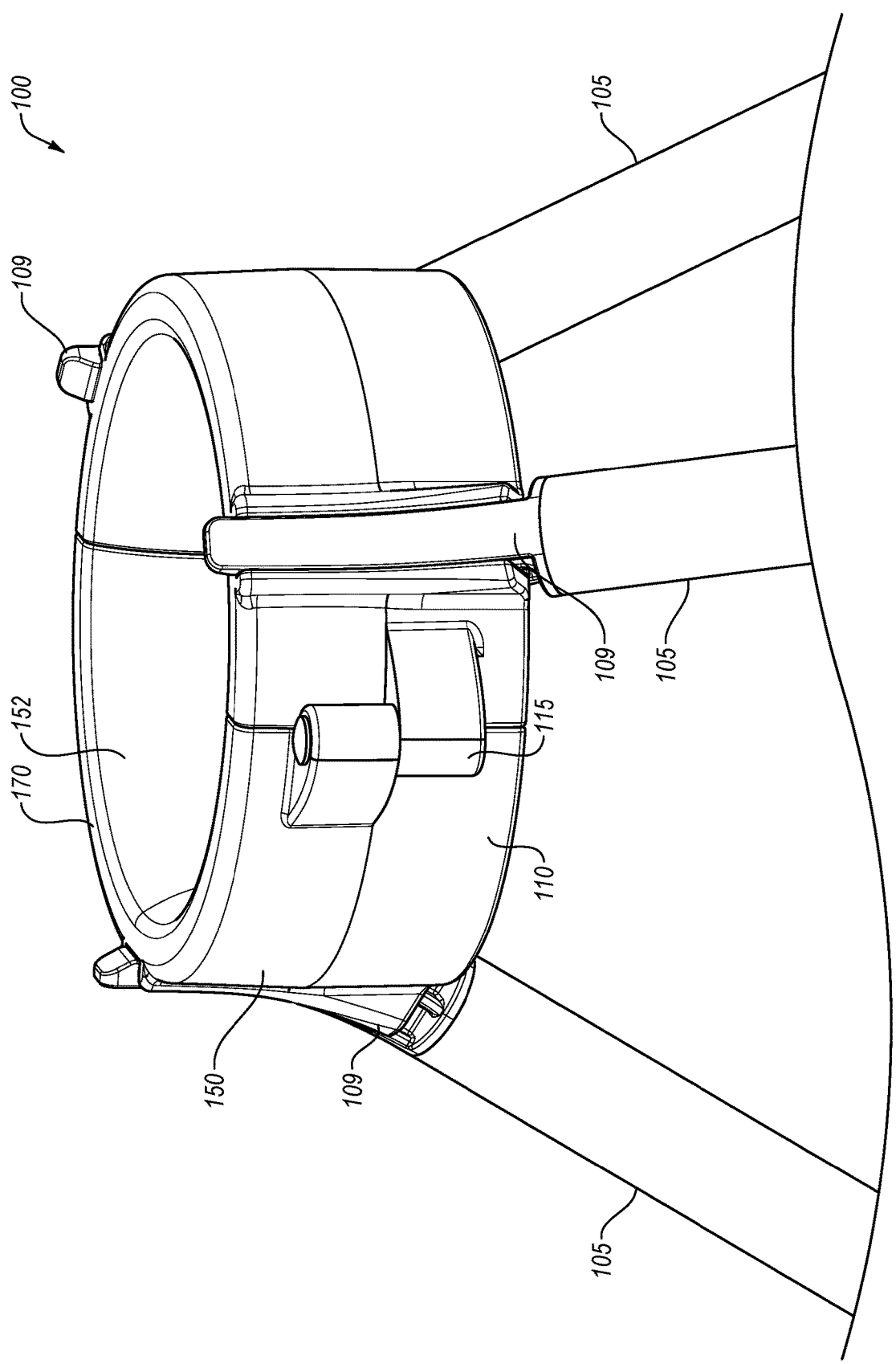
FIG. 8 illustrates a top perspective rear view of another example embodiment of the tree support assembly of FIG. 1 with the support ring in a closed configuration.

FIG. 8 illustrates a top perspective rear view of another example embodiment of the tree support assembly 100 of FIG. 1 with the support ring 110 in a closed configuration, arranged according to one or more embodiments of the present disclosure. As illustrated, the legs 105 may include the leg adapters 109, and the support ring 110 with the first half 110a and second half 110b may include the hinge 115, the exterior surface 150, the interior surface 152, and the end wall 170 (reference may be made to other figures for all other numbered elements disclosed in conjunction with FIG. 8).

In some embodiments, the fastener, such as a pin, rivet, or bolt and nut, of the hinge 115 may be made of metal. Alternatively or additionally, in some embodiments, the fastener may be made of plastic or another material. In some embodiments, first half 110a of the support ring 110 and the second half 110b of the support ring 110 may each include a rounded hole through which the fastener may extend. Alternatively or additionally, in some embodiments, the first half 110a and/or the second half 110b may each include multiple rounded holes.

Figure 9:
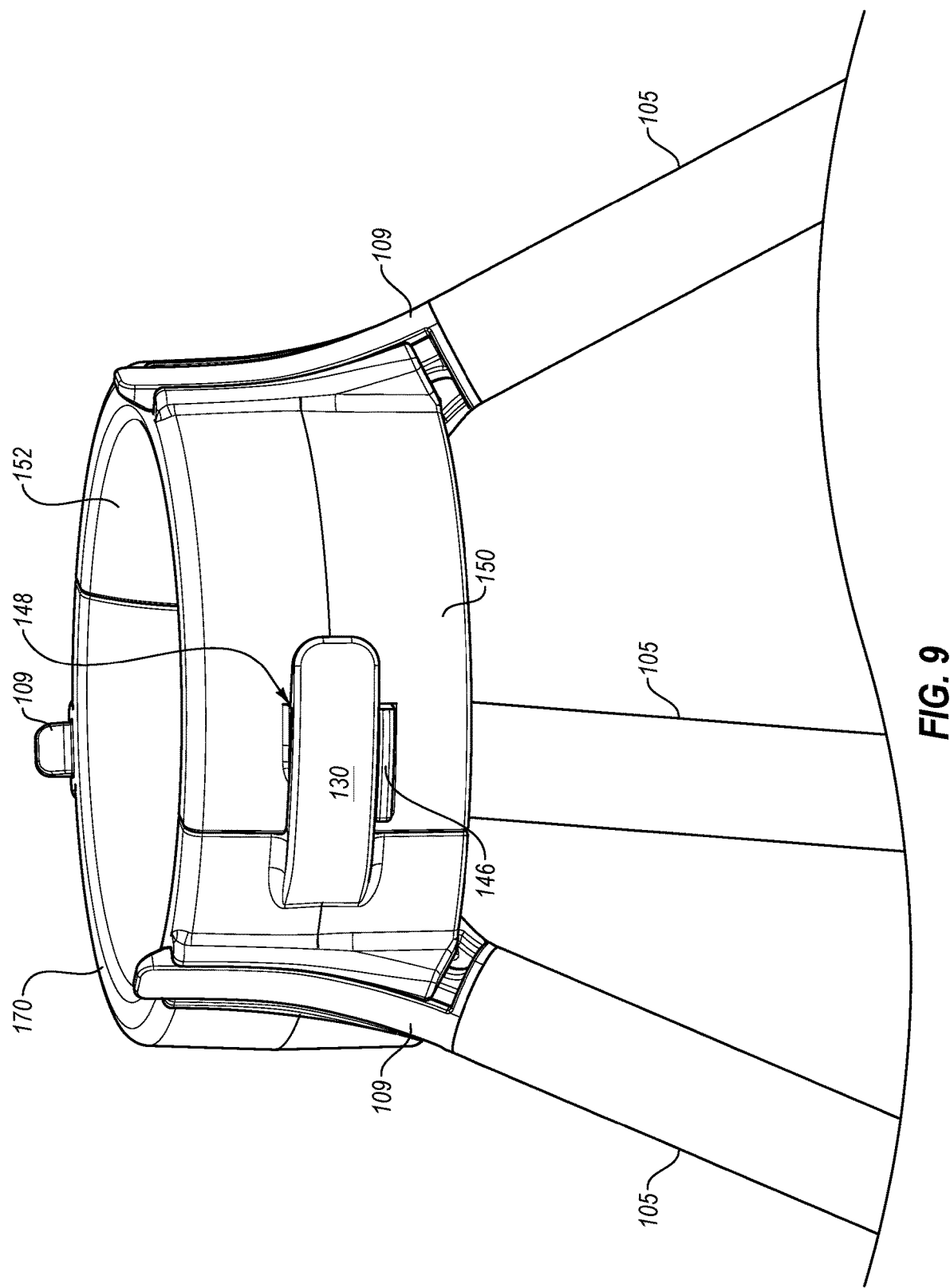
FIG. 9 illustrates a top perspective front view of another example embodiment of the tree support assembly of FIG. 1 with the support ring in a closed configuration.

FIG. 9 illustrates a top perspective front view of another example embodiment of the tree support assembly 100 of FIG. 1 with the support ring 110 in a closed configuration, arranged according to one or more embodiments of the present disclosure. As illustrated, the legs 105 may include the leg adapters 109, and the support ring 110 with the first half 110a and second half 110b may include the securing feature 130, the support ledge 146, the exterior surface 150, the interior surface 152, and the end wall 170 (reference may be made to other figures for all other numbered elements disclosed in conjunction with FIG. 9).

In some embodiments, the receiving cavities 155 on the support ring 110 may be approximately evenly spaced around the support ring 110. For example, a support ring 110 with three legs 105 may include receiving cavities 155 on the support ring 110 spaced at approximately 120 degrees apart. The first half 110a of the support ring 110 may include the closing clip, which may extend over a portion of the second half 110b of the support ring 110 when the support ring 110 is in a closed configuration. In some embodiments, the closing clip may interface with a receiving lip on the second half 110b of the support ring 110.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:
1. A tree support assembly comprising:
  three or more adjustable legs; and
  a support ring comprising:
    a first half and a second half that each includes a first end and a second end;
    a hinge pivotally connecting the respective first ends of the first half and the second half;
    a protrusion extending from the second end of the first half;

an opening disposed within the second end of the second half, the protrusion of the first half positioned within the opening of the second half in a closed-ring configuration;

a securing feature including an arm and a base, the base disposed on an exterior surface of the first half or the second half proximate to one of the respective second ends;

an outer wall that at least partially defines the exterior surface;

an inner wall that at least partially defines an interior surface of the first half and the second half;

an end wall that extends between an upper portion of the outer wall and an upper portion of the inner wall;

an engaging feature disposed on the exterior surface of the other half opposite the base of the securing feature and proximate to the corresponding second end of the other half, the engaging feature engaged with the arm of the securing feature in the closed-ring configuration; and three or more receiving cavities that each receives one of the adjustable legs, the three or more receiving cavities disposed within the exterior surface, wherein:

the three or more receiving cavities each receives a leg via a leg adapter; and the end wall includes respective engaging portions that engage with the corresponding leg adapter of each leg.

2. The tree support assembly of claim 1, wherein each of the three or more adjustable legs includes a foot, each foot rotatably adjustable and including a thru-hole to receive an anchor.

3. The tree support assembly of claim 1, wherein:

one or more of the upper portion of the outer wall, the upper portion of the inner wall, and the end wall constrains a first degree of freedom of one or both of the first half and the second half when in the closed-ring configuration; and one or more of the protrusion, an inner surface within the opening that is abuttable to the protrusion, the end wall, the outer wall, and the inner wall constrains a second degree of freedom of one or both of the first half and the second half when in the closed-ring configuration.

4. The tree support assembly of claim 1, wherein:

the engaging feature includes a support ledge parallel to the arm of the securing feature, the support ledge supporting the arm such that a third degree of freedom of one or both of the first half and the second half is constrained when in the closed-ring configuration; and the engaging feature includes a lip protruding from the exterior surface, the lip constraining a fourth degree of freedom of one or both of the first half and the second half when in the closed-ring configuration.

5. The tree support assembly of claim 1, wherein an interior surface of the first half and the second half is more convex at a first portion than at a second portion.

6. A tree support ring comprising:

a first half and a second half that each includes a first end and a second end;

a hinge pivotally connecting the respective first ends of the first half and the second half;

a protrusion extending from the second end of the first half;

an opening disposed within the second end of the second half, the protrusion of the first half positioned within the opening of the second half in a closed-ring configuration;

a securing feature including an arm and a base, the base disposed on an exterior surface of the first half or the second half proximate to one of the respective second ends;

an outer wall that at least partially defines the exterior surface;

an inner wall that at least partially defines an interior surface of the first half and the second half;

an end wall that extends between an upper portion of the outer wall and an upper portion of the inner wall;

an engaging feature disposed on the exterior surface of the other half opposite the base of the securing feature and proximate to the corresponding second end of the other half, the engaging feature engaged with the arm of the securing feature in the closed-ring configuration; and three or more receiving cavities that each receives a leg, the three or more receiving cavities disposed within the exterior surface, wherein:

the three or more receiving cavities each receives a leg via a leg adapter; and the end wall includes respective engaging portions that engage with the corresponding leg adapter of each leg.

7. The tree support ring of claim 6, wherein the first half and the second half are both shaped as half of a circle.

8. The tree support ring of claim 6, wherein the arm of the securing feature includes a clip.

9. The tree support ring of claim 6, wherein the engaging feature includes a lip protruding from the exterior surface, the lip constraining at least one degree of freedom of the arm and one or both of the first half and the second half when in the closed-ring configuration.

10. The tree support ring of claim 6, wherein the engaging feature includes a support ledge parallel to the arm of the securing feature.

11. The tree support ring of claim 10, wherein the support ledge supports the arm such that at least one degree of freedom of the arm and one or both of the first half and the second half is constrained when in the closed-ring configuration.

12. The tree support ring of claim 6, wherein one or more of the upper portion of the outer wall, the upper portion of the inner wall, and the end wall constrains at least one degree of freedom of the protrusion and one or both of the first half and the second half when in the closed-ring configuration.

13. The tree support ring of claim 6, wherein one or more of the protrusion, an inner surface within the opening that is abuttable to the protrusion, the end wall, the outer wall, and the inner wall constrains at least one degree of freedom of one or both of the first half and the second half when in the closed-ring configuration.

14. The tree support ring of claim 6, wherein support ribs are disposed between the outer wall and the inner wall.

15. The tree support ring of claim 6, wherein an interior surface of the first half and the second half is more convex at a first portion than at a second portion.

16. A method to support a tree, the method comprising:

positioning a support ring around a tree, the support ring comprising:

a first half and a second half that each includes a first end and a second end;

a hinge pivotally connecting the respective first ends of the first half and the second half;

a protrusion extending from the second end of the first half;

an opening disposed within the second end of the second half, the protrusion of the first half positioned within the opening of the second half in a closed-ring configuration;

a securing feature including an arm and a base, the base disposed on an exterior surface of the first half or the second half proximate to one of the respective second ends;

an outer wall that at least partially defines the exterior surface;

an inner wall that at least partially defines an interior surface of the first half and the second half;

an end wall that extends between an upper portion of the outer wall and an upper portion of the inner wall;

an engaging feature disposed on the exterior surface of the other half opposite the base of the securing feature and proximate to the corresponding second end of the other half, the engaging feature engaged with the arm of the securing feature in the closed-ring configuration; and three or more receiving cavities that each receives a leg, the three or more receiving cavities disposed within the exterior surface, wherein:

the three or more receiving cavities each receives a leg via a leg adapter; and the end wall includes respective engaging portions that engage with the corresponding leg adapter of each leg;

closing the support ring into the closed-ring configuration around the tree such that there is a gap between the tree and the support ring; and anchoring to a ground surface at least one of the legs received by one of the receiving cavities of the support ring.

* * * * *